US009051944B2

(12) United States Patent
Wen

(10) Patent No.: US 9,051,944 B2
(45) Date of Patent: Jun. 9, 2015

(54) HYDRAULIC SYSTEM AND CONTROL LOGIC FOR COLLECTION AND RECOVERY OF ENERGY IN A DOUBLE ACTUATOR ARRANGEMENT

(75) Inventor: Gang Wen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 551 days.

(21) Appl. No.: 13/524,926

(22) Filed: Jun. 15, 2012

(65) Prior Publication Data

US 2013/0333378 A1 Dec. 19, 2013

(51) Int. Cl.
*F16D 31/02* (2006.01)
*F15B 1/02* (2006.01)
*F15B 21/14* (2006.01)
*E02F 9/22* (2006.01)

(52) U.S. Cl.
CPC ................. *F15B 1/024* (2013.01); *F15B 21/14* (2013.01); *F15B 2211/212* (2013.01); *F15B 2211/3059* (2013.01); *F15B 2211/7107* (2013.01); *F15B 2211/7128* (2013.01); *F15B 2211/761* (2013.01); *F15B 2211/88* (2013.01); *E02F 9/2217* (2013.01); *E02F 9/2296* (2013.01)

(58) Field of Classification Search
CPC ..... F15B 1/024; F15B 21/14; F15B 2211/761
USPC ............................................... 60/414; 91/436
See application file for complete search history.

(56) References Cited

U.S. PATENT DOCUMENTS 7,269,944 B2 9/2007 Zhang et al.
7,634,911 B2 12/2009 Brinkman
7,823,379 B2 11/2010 Hamkins et al.
7,905,088 B2 3/2011 Stephenson et al.
2009/0000290 A1 1/2009 Brinkman

FOREIGN PATENT DOCUMENTS

JP 3-036333 A 2/1991
JP 4-120323 A 4/1992
JP 2004-115245 A 4/2004
JP 2008-133914 A 6/2008
WO WO 2008/013466 A1 1/2008
WO WO 2010/026677 A1 3/2010
WO WO 2010/026678 A1 3/2010

*Primary Examiner* — Edward Look
*Assistant Examiner* — Daniel Collins
(74) *Attorney, Agent, or Firm* — Leydig, Voit & Mayer, Ltd.

(57) ABSTRACT

Hydraulic unit adapted for connection to master and slave actuator system includes three valves, the first configured for selective fluid passage between the cap ends, the second configured for selective fluid passage between the slave cap end and an accumulator, and the third fluidly coupled for selective fluid passage between each of a single pump and the accumulator, and the slave cap end. During actuator retraction, the valves permit pressurized fluid in the slave cap end to be delivered to accumulator for storage; during extension, the valves permit pressurized fluid from pump and accumulator to be delivered to the slave cap end.

20 Claims, 4 Drawing Sheets

HYDRAULIC SYSTEM AND CONTROL LOGIC FOR COLLECTION AND RECOVERY OF ENERGY IN A DOUBLE ACTUATOR ARRANGEMENT

TECHNICAL FIELD

This patent disclosure relates generally to hydraulic systems including energy recovery systems, and, more particularly to a hydraulic system having a pair of actuators and control logic for collection and recovery of energy.

BACKGROUND

Machines may be used to move heavy loads, such as earth, construction material, and/or debris, and may include, for example, a wheel loader, an excavator, a front shovel, a bulldozer, a backhoe, and a telehandler. Such machines may utilize an object such as a work implement to move the heavy loads. Machines may power work implements by a hydraulic system that uses pressurized fluid to actuate one or more hydraulic actuators to move the work implement. During operation of the machine, the implement may be raised to an elevated position. As the implement may be relatively heavy, the implement may gain potential energy when raised to the elevated position. As a result, machines that utilize hydraulic systems often include energy recovery systems to recover or recycle the energy associated with releasing the implement from the elevated position. Recovering that lost or otherwise wasted potential energy for reuse may improve work machine efficiency.

One system designed to recover or recycle the energy associated with lowering a load is disclosed in U.S. Pat. No. 7,823,379 to Hamkins, et al. ("Hamkins"). Hamkins discloses a hydraulic circuit including master and slave actuators as part of a boom circuit, a swing circuit, a pair of pumps for supplying fluid to the circuits, an accumulator, a valve that controls flow between the accumulator an the slave actuator, and a valve that controls flow directly from the pump to the accumulator. That is, flow between the slave actuator and the accumulator is controlled by a single valve.

SUMMARY

The disclosure describes, in one aspect, a hydraulic system for moving a load wherein the hydraulic system includes a fluid source, master and slave actuators coupled to and capable of moving the load, and a pump adapted to deliver pressurized hydraulic fluid to each of the actuators such that the master actuator is capable of providing movement based on flow between the pump and the master actuator, and between the master actuator and the fluid source. Each of the actuators includes a cap end and a rod end. The hydraulic system also includes at least one hydraulic energy storage device fluidly coupled to the cap end of the slave actuator. The hydraulic system further includes first, second and third valves. The first valve is fluidly coupled between and configured to selectively permit passage of fluid between the cap ends of the actuators. The second valve is fluidly coupled between and configured to selectively permit passage of fluid between the cap end of the slave actuator and the storage device. The third valve is fluidly coupled between the cap end of the slave actuator and each of the pump and the hydraulic energy storage device. The third valve is configured to selectively permit passage of fluid between the storage device and the cap end of the slave actuator, and to selectively permit passage of fluid between the pump and the cap end of the slave actuator. During retraction of each of the actuators, (i) pressurized fluid is deliverable to the rod ends of the master actuator, and (ii) the first, second, and third valves are movable to respective positions to permit pressurized fluid in the cap end of the slave actuator to be delivered to the storage device for storage. During extension of each of the actuators, the first, second, and third valves are movable to respective positions to permit (i) pressurized fluid from the pump to be delivered to the cap end of the master actuator, and (ii) pressurized stored fluid from the storage device to be delivered to the cap end of the slave actuator.

The disclosure also describes, in another aspect, a method of controlling a hydraulic system. The hydraulic system includes a fluid source, a pump, and master and slave actuators adapted to be coupled to and capable of moving a load, each of the actuators having a rod end and a cap end. The method includes the steps of: fluidly coupling a first valve between the cap ends of each of the actuators, the first valve being configured to selectively permit passage of fluid between the cap ends; fluidly coupling the hydraulic energy storage device to the cap end of the slave actuator; fluidly coupling a second valve between the cap end of the slave actuator and the storage device, the second valve being configured to selectively permit passage of fluid therebetween; fluidly coupling a third valve between the cap end of the slave actuator and each of the pump and the storage device, the third valve being configured to selectively permit passage of fluid between the pump and the cap end of the slave actuator, and to selectively permit passage of fluid between the storage device and the cap end of the slave actuator. According to the method, during retraction of each of the actuators, the method includes (i) delivering pressurized fluid to the rod ends of the master and slave actuators, and (ii) disposing the first, second, and third valves in respective positions to permit pressurized fluid in the cap end of the slave actuator to be delivered to the storage device for storage. During extension of each of the actuators, the method includes disposing the first, second, and third valves in respective positions to permit (i) delivering pressurized fluid from the pump to be delivered to the cap end of the master actuator and (ii) delivering pressurized stored fluid from the hydraulic energy storage device to the cap end of the slave actuator.

The disclosure further describes a hydraulic unit adapted for connection to a hydraulic system. The hydraulic system includes a fluid source, a pump adapted to deliver pressurized hydraulic fluid to each of the actuators, a master actuator and a slave actuator coupled to and capable of moving a load, each of the master and slave actuators having a rod end and a cap end, and at least one hydraulic energy storage device. The hydraulic unit is adapted to be fluidly coupled between the cap ends of the master and slave actuators, the hydraulic energy storage device, and the pump. The hydraulic unit includes first, second and third valve The first valve is adapted to be fluidly coupled and configured to selectively permit passage of fluid between the cap ends of the master and slave actuators. The second valve is adapted to be fluidly coupled and configured to selectively permit passage of fluid between the cap end of the slave actuator and the hydraulic energy storage device. The third valve is adapted to be fluidly coupled between the cap end of the slave actuator and each of the pump and the hydraulic energy storage device. The third valve is configured to selectively permit passage of fluid between the storage device and the cap end of the slave actuator, and to selectively permit passage of fluid between the pump and the cap end of the slave actuator. During retraction of each of the actuators, (i) pressurized fluid is deliverable to the rod ends of the master actuator, and (ii) the first, second, and third valves are movable to respective positions to permit pressurized fluid in the cap end of the slave actuator to be delivered to the storage device for storage. During extension of each of the actuators, the first, second, and third valves are movable to respective positions to permit (i) pressurized fluid from the pump to be delivered to the cap end of the master actuator, and (ii) pressurized stored fluid from the storage device to be delivered to the cap end of the slave actuator.

BRIEF DESCRIPTION OF THE DRAWING(S)

DETAILED DESCRIPTION

Figure 1:
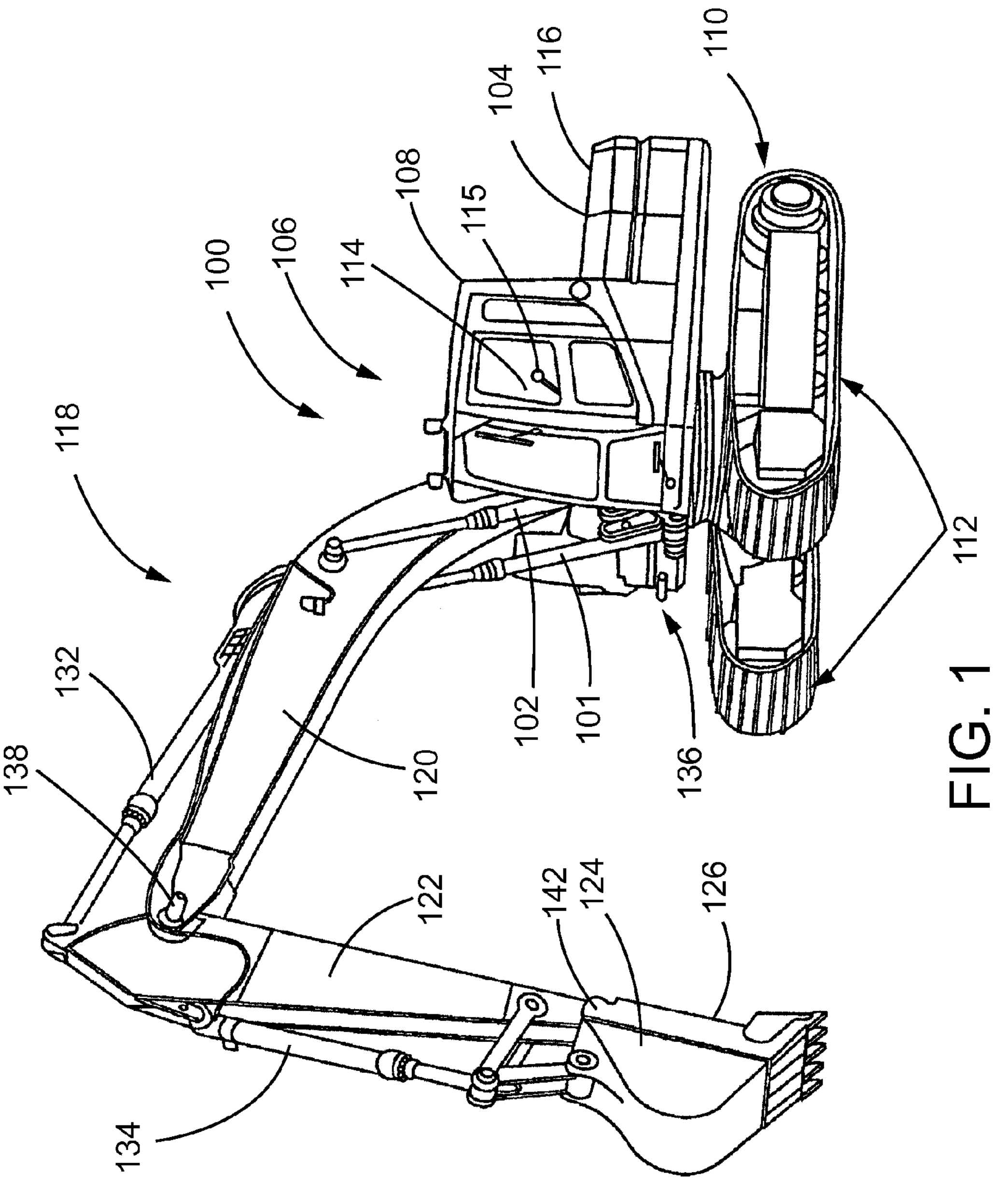
FIG. 1 is an isometric view of a machine incorporating aspects of this disclosure.

This disclosure relates to machines 100 that utilize one or more pairs of hydraulic actuators 101, 102 (see also FIGS. 2-4) to control movement of moveable subassemblies of the machine, such as arms, booms, implements, or the like that may or may not carry an associated supplemental load. More specifically, the disclosure relates to hydraulic systems 104 utilized in machines 100, such as the excavator 106 illustrated in FIG. 1, used to control extension and retraction of paired hydraulic actuators 101, 102. While the arrangement is illustrated in connection with an excavator 106, the arrangement disclosed herein has universal applicability in various other types of machines 100 as well. The term “machine” may refer to any machine that performs some type of operation associated with an industry such as mining, construction, farming, transportation, or any other industry known in the art. For example, the machine may be a wheel loader or a skid steer loader. Moreover, one or more implements may be connected to the machine 100. Such implements may be utilized for a variety of tasks, including, for example, brushing, compacting, grading, lifting, loading, plowing, ripping, and include, for example, augers, blades, breakers/hammers, brushes, buckets, compactors, cutters, forked lifting devices, grader bits and end bits, grapples, blades, rippers, scarifiers, shears, snow plows, snow wings, and others.

The excavator 106 of FIG. 1 includes a cab 108 on a frame 136 that is mounted on an undercarriage 110 that includes a pair of tracks 112. The cab 108 includes an operator station 114 from which the machine 100 may be controlled. The operator station 114 may include, for example, an operator control 115 for controlling the extension and retraction of the hydraulic actuators 101, 102. The operator control 115 may be of any appropriate design. By way of example only, the operator control 115 may be in the form of joystick, such as illustrated in FIG. 1, a dial, a switch, a lever, a combination of the same, or any other arrangement that provides the operator with a mechanism by which the operator may command movement.

The frame 136 may further support an engine 116, and at least a portion of the hydraulic system 104. The engine 116 may be an internal combustion engine or any type power source known to one skilled in the art now or in the future.

A front linkage 118 includes a boom 120 that is pivoted on the frame 136, a stick 122 pivoted to the boom 120, and an implement 124 pivotably coupled to the stick 122. While the implement 124 is illustrated as a bucket 126, the implement 124 may alternately be, for example, a compactor, a grapple, a multi-processor, thumbs, a rake, a ripper, or shears.

Movement of the boom 120, stick 122, and implement 124 is controlled by a number of actuators 101, 102, 132, 134. The boom 120 is pivotably coupled at one end to the frame 136. To control movement of the boom 120 relative to the frame 136, the pair of actuators 101, 102 are provided, the actuators 101, 102 being disposed on either side of the boom 120, coupled at one end to the frame 136, and at the other end to the boom 120. The stick 122 is pivotably coupled to the boom 120 with a pivot pin 138; movement of the stick 122 relative to the boom 120 is controlled by the actuator 132. The implement 124 is pivotably coupled to the stick 122 with a pivot pin 142; movement of the implement 124 relative to the stick 122 is controlled by actuator 134.

Figure 2:
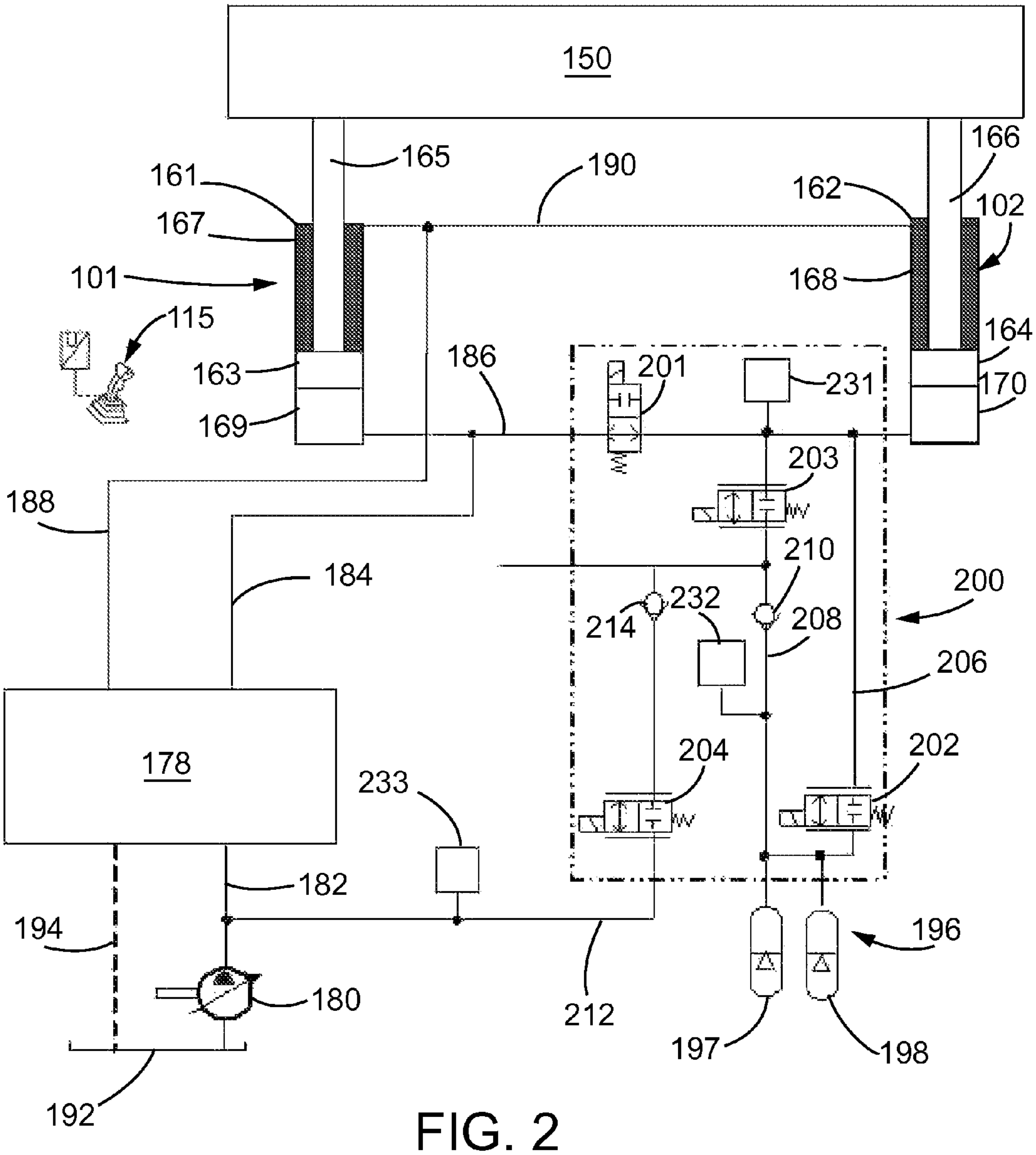
FIG. 2 is a schematic view of a hydraulic system according to this disclosure.

The hydraulic system 104, which controls the movement of the pair of actuators 101, 102, and, therefore, the movement of the boom 120, is shown in greater schematic detail in FIG. 2. While the operation of the hydraulic system 104 is explained below with regard to actuators 101, 102, the explanation is equally applicable to other actuators similarly disposed in pairs, for example in connection with the movement of an arm or an implement. For the purposes of this disclosure, however, the twin “load” 150 will be used to describe that to which the actuators 101, 102 impart movement, here, the boom 120, stick 122, implement 124, and actuators 132, 134, as well as any supplemental load, such as dirt, carried within the implement 124. In another application, such as when a pair of actuators directly move an implement, for example, the load may be the implement and any supplemental load.

Each actuator 101, 102 includes a cylinder 161, 162 in which a piston 163, 164 with a rod 165, 166 secured on it outputs linear motion. In this way, the piston 163, 164 divides the interior of the cylinder 161, 162 into a rod end 167, 168 and a cap end 169, 170. In operation, as the respective actuator 101, 102 is extended, hydraulic fluid flows from the rod end 167, 168 and hydraulic fluid flows into the cap end 169, 170 as the piston 163, 164 and rod 165, 166 slide within the cylinder 161, 162 to telescope the rod 165, 166 outward from the actuator 101, 102. Conversely, as the actuator 101, 102 is retracted, hydraulic fluid flows into the rod end 167, 168 and hydraulic fluid flows out of the cap end 169, 170 as the piston 163, 164 and rod 165, 166 slide within the cylinder 161, 162 to retract the rod 165, 166 into the cylinder 161, 162.

In order to provide hydraulic fluid flow to the rod and cap ends 167, 168, 169, 170 of the actuators 101, 102, a selectively actuatable directional control valve assembly 178, a pump 180, and a plurality of conduits 182, 184, 188, and connections 186, 190 are provided. The directional control valve assembly 178 directs flow of fluid between the rod and cap ends 167, 168, 169, 170 of the actuators 101, 102, as well as the pump 180, which is fluidly coupled to the directional control valve assembly 178 by way of conduit 182, and a hydraulic fluid source or sump 192, which is coupled to the directional control valve assembly 178 by way of a drain 194.

The illustrated pump 180 is a variable displacement pump. It will thus be appreciated that the displacement of the pump 180, and, accordingly, the flow rate is controlled in order to control both the volume of the flow of hydraulic fluid from the pump 180 toward the actuators 101, 102 as commanded by the operator by way of control 115. While a variable displacement pump 180 is illustrated, the same result may be obtained by the inclusion of a fixed displacement pump wherein the speed may be varied by an associated driving motor (not illustrated).

During extension of the actuators 101, 102, the directional control valve assembly 178 may direct flow toward either of the cap ends 169, 170 of the actuators 101, 102 by way of conduit 184. An associated cap end connection 186 permits flow between the cap ends 169, 170 of the actuators 101, 102. Similarly, during retraction, the directional control valve assembly 178 may direct flow to the rod ends 167, 168 of the actuators 101, 102 by way of conduit 188, the rod end connection 190 similarly fluidly coupling the rod ends of the actuators 101, 102.

Flow may be provided to the directional control valve assembly 178 by way of the pump 180, or returning flow from the rod and cap ends 167, 168, 169, 170 of the actuators 101, 102, depending upon whether a retraction or an extension is commanded. It will thus be understood by those of skill in the art, that the directional control valve assembly 178 is adapted to direct fluid flow between the rod and cap ends 167, 168, 169, 170 of the actuators 101, 102, or between the pump 180 and the rod and cap ends 167, 168, 169, 170 of the actuators 101, 102, or between the rod and cap ends 167, 168, 169, 170 of the actuators 101, 102 and the sump 192.

In order to recover or recycle the energy associated with releasing the load 150 from the elevated position, a hydraulic energy storage device 196 is provided. In the illustrated embodiment, the hydraulic energy storage device 196 includes a pair of fluid accumulators 197, 198, although any appropriate number or arrangement of storage devices may be utilized.

The hydraulic system 104 further includes a hydraulic unit 200 that is fluidly coupled between the cap ends 169, 170 of the actuators 101, 102, the hydraulic energy storage device 196, and the pump 180. It will be appreciated by those of skill in the art that such a hydraulic unit 200 may be connected within an existing hydraulic system 104, as, for example, when repair or replacement is required.

The hydraulic unit 200 includes at least three valves 201, 202, 203 disposed to selectively control flow between the cap ends 169, 170 of the actuators 101, 102 and the hydraulic energy storage device 196. In the illustrated embodiment, a fourth valve 204 controls flow from the pump 180 and the cap end 170 of the slave actuator 102. The actuator 101, which, in the illustrated embodiment, is disposed to always receive flow by way of the directional control valve assembly 178, is often called a master actuator 101. In contrast, the actuator 102, which is disposed to receive flow from the directional control valve assembly 178 or the hydraulic energy storage device 196, is often called a slave actuator 102.

As may be seen in FIG. 2, the first valve 201 is fluidly coupled in the cap end connection 186 between the cap ends 169, 170 of the master and slave actuators 101, 102. The first valve 201 includes at least two positions, one which allows passage of fluid, and one which prevents the passage of fluid between the cap ends 169, 170 of the master and slave actuators 101, 102. In the embodiment illustrated in FIG. 2, the first valve 201 is biased to its open position, allowing the passage of fluid. Upon actuation based upon a signal or command, however, the first valve 201 may be moved to its closed position, preventing fluid flow.

In order to couple the cap end 170 of the slave actuator 102 to hydraulic energy storage device 196, a storage fluid connection 206 and a recovery fluid connection 208 are provided. In the illustrated embodiment, the storage and recovery fluid connections 206, 208 are fluidly coupled to the cap end connection 186 between the first valve 201 and the cap end 170 of the slave actuator 102. It will be appreciated that the storage and recovery fluid connections 206, 208 may be alternately disposed, so long as the flow between the cap ends 169, 170 of the master and slave actuators 101, 102 may be selectively inhibited or prevented during flow through the storage and recovery fluid connections 206, 208 to or from the hydraulic energy storage device 196.

The second and third valves 202, 203 are fluidly coupled in the storage and recovery fluid connections 206, 208, respectively. In this way, the second and third valves 202, 203 are configured to selectively permit passage of fluid between the cap end 170 of the slave actuator 102 and the hydraulic energy storage device 196. As with the first valve 201, the second and third valves 202, 203 each include at least two positions, one which allows passage of fluid, and one which prevents the passage of fluid. In contrast to the first valve 201, however, the second and third valves 202, 203 in the illustrated embodiment are biased to their respective closed positions, preventing fluid flow. Upon actuation based upon appropriate signals or commands, however, the second and third valve 202, 203 may each selectively be moved to their respective open positions, allowing the passage of fluid.

In order to provide flow in only one direction from the hydraulic energy storage device 196 and the cap end 170 of the slave actuator 102 through the recovery fluid connection 208, a recovery check valve 210 may be provided in the recovery fluid connection 208. In this way, flow is directed to the hydraulic energy storage device 196 by way of the storage fluid connection 206, and fluid from the hydraulic energy storage device 196 flows through the recovery fluid connection 208.

A supplemental fluid connection 212 may be provided between the pump 180 and the cap end 170 of the slave actuator 102, the fourth valve 204 being disposed in the supplemental fluid connection 212. The significance of the supplemental fluid connection 212 will be explained in greater detail relative to the operation of the hydraulic unit 200 and the hydraulic system 104. As with the first, second and third valves 201, 202, 203, the fourth valve 204 includes at least two positions, one which allows passage of fluid, and one which prevents the passage of fluid. Like the second and third valves 202, 203, the fourth valve 204 may be biased to its closed position, preventing fluid flow, actuating to move to its open position to allow the passage of fluid upon appropriate signals or commands. In order to provide flow in only one direction, that is, from the pump 180 toward the cap end 170 of the slave actuator 102 through the supplemental fluid connection 212, a supplemental check valve 214 may be provided in the supplemental fluid connection 212.

In the illustrated embodiment, the first, second, third, and fourth valve 204 as well as the recovery check valve 210 and the supplemental check valve 214 are disposed within the hydraulic unit 200. It will be appreciated, however, that one or more may be disposed outside or remote to the hydraulic unit 200.

It will be noted that the third valve 203 may be disposed downstream from the fourth valve 204, as in the illustrated embodiment. In this way, the third valve 203 may ultimately provide control over flow from both the hydraulic energy storage device 196 and the pump 180.

The hydraulic system 104 and/or hydraulic unit 200 may include one or more pressure sensors 231, 232, 233 disposed and adapted to provide an indication of fluid pressure within the hydraulic system 104 and/or the hydraulic unit 200. In the illustrated embodiment, a first sensor 231 is disposed and adapted to provide an indication of fluid pressure between the first valve 201 and the cap end 170 of the slave actuator 102.

A second pressure sensor 232 is disposed and adapted to provide an indication of fluid pressure between the hydraulic energy storage device 196 and the third valve 203. A third pressure sensor 233 is disposed and adapted to provide an indication of fluid pressure between the pump 180 and the fourth valve 204. It will be noted that first and second pressure sensors 231, 232 are disposed within the hydraulic unit 200 in the illustrated embodiment, while the third pressure sensor 233 is disposed outside the hydraulic unit 200. It will be appreciated, however, that the third pressure sensor 233 could alternately be disposed within the hydraulic unit 200 such that the hydraulic unit 200 may be fluidly connected as a single unit within the cap end connection 186 between the cap ends 169, 170 of the master and slave actuators 101, 102, and fluidly connected to the hydraulic energy storage device 196 and supplemental fluid connection 212. Likewise, either or both of first and second pressure sensors 231, 232 may be disposed outside or remote to the hydraulic unit 200 in alternate embodiments.

Turning now to the operation of the hydraulic system 104, when the load 150 is to be held in a given position, the directional control valve assembly 178 blocks flow to the actuators 101, 102, and the first, second, third, and fourth valves 201, 202, 203, 204 are disposed in the positions shown in FIG. 2. In other words, in the illustrated embodiment, the first, second, third, and fourth valves 201, 202, 203, 204 are deenergized. The second, third, and fourth valves prevent flow to and from the hydraulic energy storage device and from to pump to the cap end 170 of the slave actuator 102. In contrast, the first valve 201 remains in the open position. As a result, the cap end connection 186 provides an open fluid connection between the cap ends 169, 170 of the master and slave actuators 101, 102, and the rod end connection 190 provides an open fluid connection between the rod ends 167, 168 of the master and slave actuators 101, 102.

Figure 3:
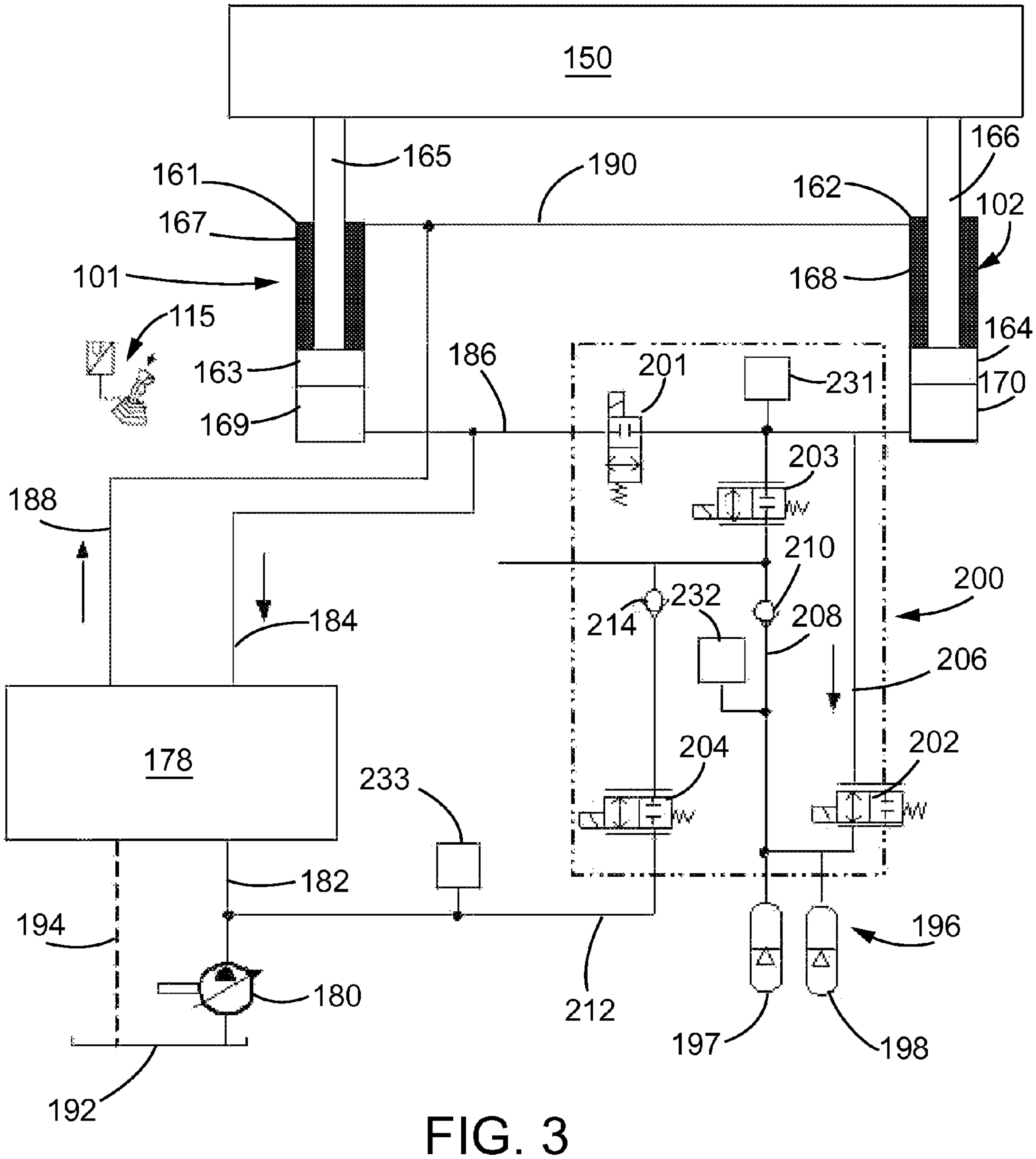
FIG. 3 is a fragmentary schematic view of the hydraulic system of FIG. 2 wherein a retraction of the accumulators is commanded.

FIG. 3 illustrates the operation of the hydraulic system 104 when the operator commands the load 150 to be lowered or the actuators 101, 102 retracted, for example, as when the operator moves the operator control 115 to lower the boom 120 of the excavator 106 of FIG. 1. During retraction, the force of the load 150 causes the fluid from the cap ends 169, 170 to flow from the actuators 101, 102. When commanded to lower the load 150, the first valve 201 is actuated to move to a position to prevent flow between the cap ends 169, 170 of the master and slave actuators 101, 102, and the second valve 202 is moved to an open position. The flow of fluid within the hydraulic system 104 is graphically illustrated by arrows. When lowering the load 150, pressure may be monitored at the first pressure sensor 231, that is the pressure of fluid flowing from the cap end 170 of the slave actuator 102. The third valve 203 is maintained in a closed position, preventing flow through recovery fluid connection 208.

It will be appreciated by those of skill in the art that the volumes of hydraulic fluid flowing out of the cap ends 169, 170 during retraction of the actuators 101, 102 is not equal to the volume of fluid flowing into the rod ends 167, 168. This is a result of the difference in area of the pistons 163, 164 on the rod and cap ends 167, 168, 169, 170, that is, the surface area of the piston 163, 164 where the rod 165, 166 extends from the piston 163, 164 is less than the surface area of the piston 163, 164 facing the cap end 169, 170. Consequently, during retraction of the actuator 101, 102, more hydraulic fluid flows from the cap ends 169, 170 than can be utilized in the rod ends 167, 168 if the rod and cap ends 167, 168, 169, 170 were to be directly fluidly connected.

With the first valve 201 closed, fluid from the cap end 169 of the master actuator 201 is directed through conduit 184 to the directional control valve assembly 178. The directional control valve assembly 178 redirects fluid from the cap end 169 to the rod ends 167, 168 through the conduit 188 and rod end connection 190. Additional fluid may be provided to the directional control valve assembly 178 and to the rod ends 167, 178 of the master and slave actuators 101, 102 by way of the pump 180, if necessary.

By way of contrast, with the second valve 202 opened to allow flow, fluid from the cap end 170 of the slave actuator 102 flows to the hydraulic energy storage device 196 by way of the storage fluid connection 206. In this way, the flow from the cap end 170 of the slave actuator 102 charges the hydraulic energy storage device 196, storing potential energy for later usage.

Figure 4:
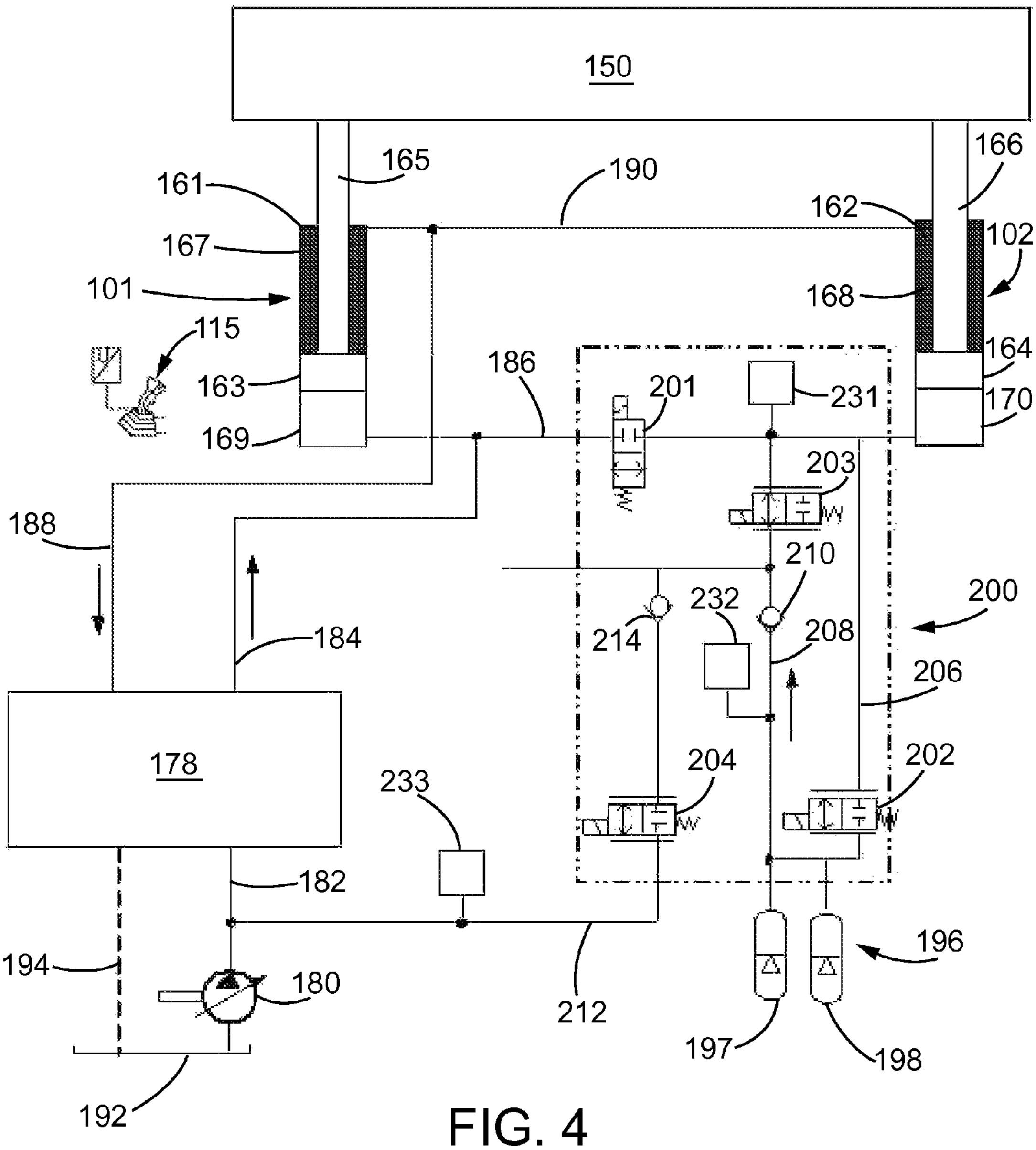
FIG. 4 is a fragmentary schematic view of the hydraulic system of FIG. 2 wherein an extension of the accumulators is commanded.

Turning to an extension operation, when the operator commands a raising of the load 150, the flow of fluid within the hydraulic system 104 is graphically illustrated by a number of arrows in FIG. 4. In this mode, the first valve 201 likewise is moved to closed position, preventing flow between the cap ends 169, 170 of the master and slave actuators 101, 102. In contrast to a retraction operation, however, the second valve 202 is closed, preventing flow through the storage fluid connection 206 toward the hydraulic energy storage device 196, and the third valve 203 is moved to an open position. When raising the load 150, the directional control valve assembly 178 is moved to a position directing fluid flow through connection 184 toward the cap end 169, flow returning to the directional control valve assembly 178 from the rod ends 167, 168 by way of connection 188. Thus, as the master and slave actuators 101, 102 extend, fluid from the rod ends 167, 168 of the master and slave actuators 101, 102 may flow through conduit 188 to directional control valve assembly 178 and on to the sump 192 through the drain 194. Pressure may be monitored at each of the pressure sensors 231, 232, 233.

In order to extend the master actuator 101, fluid from the pump 180 proceeds to the directional control valve assembly 178 and conduit 184 to the cap end 169 of the master actuator 101. In contrast, in order to extend the slave actuator 102, with the third valve 203 in an open position, fluid is supplied from the hydraulic energy storage device 196 through the recovery fluid connection 208 to the cap end 170 of the slave actuator 102. Check valve 210 ensures that the flow proceeds only toward the slave actuator 102.

Should flow from the hydraulic energy storage device 196 be inadequate to extend the slave actuator 102, the fourth valve 204 may be opened and supplemental flow may be provided by the pump 180 through the supplemental fluid connection 212. Again, check valve 214 ensure that flow from the pump 180 proceeds only toward the slave actuator 102. In this regard, monitoring pressure at the second pressure sensor 232, if the pressure falls below a threshold setting, the fourth valve 204 may be opened to provide flow from the pump 180 through supplemental fluid connection 212. It will be noted that, in the illustrated embodiment, with the fourth valve 204 in the open position, flow from the pump 180 toward the cap end 170 of the slave actuator 102 proceeds through the open third valve 203. In an alternate embodiment, the flow from the pump 180 may have a direct connection to the cap end 170 of the slave actuator 102, bypassing the third valve 203 entirely.

INDUSTRIAL APPLICABILITY

The present disclosure is applicable to hydraulic systems 104 that include a master and slave actuator 101, 102 and wherein potential energy resulting from movement of a load may be recovered for later use. Embodiments of the disclosed hydraulic system 104 may recover otherwise lost or wasted potential energy for later reuse. As a result, the hydraulic system 104 may improve machine efficiency.

Because flow to and from the hydraulic energy storage device is controlled by two separate valves 203, 202, the velocities when raising and lowering the load 150 may be tuned and changed individually without affecting the controllability of the other. This may provide a hydraulic system 104 wherein the hydraulic energy storage device 196 may discharge at a pressure that is lower than would result from a system utilizing a single valve, as opposed to the second and third valves 202, 203 of the current hydraulic system 104.

In some embodiments, the recovery ratio may be relatively high inasmuch as losses may result primarily from line pressure drop and valve throttling loss along with efficiency loss due to the hydraulic energy storage device 196. For example, in the current system, the slave actuator 102 will be charged by the hydraulic energy storage device 196 so long as the pressure at the hydraulic energy storage device 196 is greater than the pressure at the cap end 170 of the slave actuator 102, accounting for losses. That is, as a general proposition, the hydraulic energy storage device 196 may discharge until such time as the pressure at the second pressure sensor 232 is equal to the pressure at the first pressure sensor 231.

In some embodiments, such features may facilitate the utilization of a relatively smaller hydraulic energy storage device 196, as opposed to traditional single valve systems. Further, in some embodiments, the relatively smaller hydraulic energy storage device 196 may be disposed in close proximity to the slave actuator 102, minimizing line losses.

Some embodiments may also provide for a smooth transition from charging by the hydraulic energy storage device 196 to charging by the pump 180. As the pressure from the hydraulic energy storage device 196 lowers, the fourth valve 204 may be opened to allow supplemental flow from the pump 180, allowing the supplemental flow from the pump 180 to ramp up while the flow from the hydraulic energy storage device 196 ramps down.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A hydraulic system for moving a load, the hydraulic system comprising:

a fluid source, a master actuator including a cap end and a rod end, and being coupled to the load and capable of providing movement to the load, a slave actuator including a cap end and a rod end, and being coupled to the load and capable of providing movement to the load with the master actuator, a pump adapted to deliver pressurized hydraulic fluid to each of the actuators, the master actuator being capable of providing movement based on flow between the pump and the master actuator, and between the master actuator and the fluid source, a first valve fluidly coupled between the cap ends of each of the actuators, and configured to selectively permit passage of fluid between the cap ends, at least one hydraulic energy storage device fluidly coupled to the cap end of the slave actuator, a second valve fluidly coupled between the cap end of the slave actuator and the storage device, and configured to selectively permit passage of fluid therebetween, a third valve fluidly coupled between the cap end of the slave actuator and each of the pump and the hydraulic energy storage device, and configured to selectively permit passage of fluid between the single pump and the cap end of the slave actuator, and to selectively permit passage of fluid between the storage device and the cap end of the slave actuator, wherein during retraction (boom lower) of each of the actuators, (i) pressurized fluid is deliverable to the rod ends of the master actuator, and (ii) the first, second, and third valves are movable to respective positions to permit pressurized fluid in the cap end of the slave actuator to be delivered to the storage device for storage, wherein during extension (boom raise) of each of the actuators, the first, second, and third valves are movable to respective positions to permit (i) pressurized fluid from the pump to be delivered to the cap end of the master actuator, and (ii) pressurized stored fluid from the storage device to be delivered to the cap end of the slave actuator.

2. The hydraulic system of claim 1 further including a fourth valve fluidly coupled between the pump and the third valve, and wherein during extension of the slave actuator, the fourth valve is movable to a position to permit a portion of the pressurized fluid from the pump to be delivered to the cap end of the slave actuator.

3. The hydraulic system of claim 2 further including at least one pressure sensor disposed and adapted to provide an indication of fluid pressure within at least one of a fluid connection between the first valve and the cap end of the slave actuator, within a fluid connection between the at least one hydraulic energy storage device and the third valve, or within a fluid connection between the pump and the fourth valve.

4. The hydraulic system of claim 3 including at least first, second, and third said pressure sensors, the first pressure sensor being disposed and adapted to provide an indication of fluid pressure within the fluid connection between the first valve and the cap end of the slave actuator, the second pressure sensor being within the fluid connection between the at least one hydraulic energy storage device and the third valve, and the third pressure sensor being within the fluid connection between the pump and the fourth valve.

5. The hydraulic system of claim 4 wherein the fourth valve is disposed and adapted to prevent the passage of fluid when the fluid pressure at the second pressure sensor is above a threshold setting, and the fourth valve is disposed and adapted to permit the passage of fluid when the fluid pressure at the second sensor is below the threshold setting.

6. The hydraulic system of claim 5 further including a selectively actuatable directional control valve assembly fluidly connected to the pump, the rod end of the master actuator, the rod end of the slave actuator, and the cap end of the master actuator, wherein the directional control valve is moveable between an extension position, a retraction position, and a hold position in response to a command signal wherein the first valve is disposed to allow passage of fluid between the cap ends, and the second and third valves are disposed to prevent flow to and from the hydraulic energy storage device when the selectively actuatable directional control valve is disposed in the hold position.

7. The hydraulic system of claim 1 including a selectively actuatable directional control valve assembly fluidly connected to the pump, the rod end of the master actuator, the rod end of the slave actuator, and the cap end of the master actuator, wherein the directional control valve is moveable between an extension position, a retraction position, and a hold position in response to a command signal.

8. The hydraulic system of claim 7 wherein the first valve is disposed to allow passage of fluid between the cap ends, and the second and third valves are disposed to prevent flow to and from the hydraulic energy storage device when the selectively actuatable directional control valve is disposed in the hold position.

9. The hydraulic system of claim 1 further including a first check valve fluidly coupled between the hydraulic energy storage device and the cap end of the slave actuator, the first check valve preventing fluid flow from the cap end of the slave actuator toward the hydraulic energy storage device.

10. The hydraulic system of claim 9 further including a second check valve fluidly coupled between the pump and the cap end of the slave actuator, the second check valve permitting fluid flow from the pump toward the cap end of the slave actuator.

11. A method of controlling a hydraulic system including master and slave actuators adapted to be coupled to a load, the master actuator having a rod end and a cap end, the slave actuator having a rod end and a cap end, a fluid source, a pump adapted to deliver pressurized hydraulic fluid from the fluid source each of the actuators, the master actuator being capable of providing movement based on flow between the pump and the master actuator, and between the master actuator and the fluid source, and at least one hydraulic energy storage device, the method comprising the steps of:

fluidly coupling a first valve between the cap ends of each of the actuators, the first valve being configured to selectively permit passage of fluid between the cap ends, fluidly coupling the hydraulic energy storage device to the cap end of the slave actuator, fluidly coupling a second valve between the cap end of the slave actuator and the storage device, the second valve being configured to selectively permit passage of fluid therebetween, fluidly coupling a third valve between the cap end of the slave actuator and each of the single pump and the storage device, the third valve being configured to selectively permit passage of fluid between the single pump and the cap end of the slave actuator, and to selectively permit passage of fluid between the storage device and the cap end of the slave actuator, wherein during retraction of each of the actuators, (i) delivering pressurized fluid to the rod ends of the master and slave actuators, and (ii) disposing the first, second, and third valves in respective positions to permit pressurized fluid in the cap end of the slave actuator to be delivered to the storage device for storage, and wherein during extension of each of the actuators, disposing the first, second, and third valves in respective positions to permit (i) delivering pressurized fluid from the pump to be delivered to the cap end of the master actuator, and (ii) delivering pressurized stored fluid from the hydraulic energy storage device to the cap end of the slave actuator.

12. The method of claim 11 including the following steps when a hold is commanded:

disposing the first valve to allow passage of fluid between the cap ends, and disposing the second and third valves to prevent flow to and from the hydraulic energy storage device.

13. The method of claim 11 further including steps of:

fluidly coupling a fourth valve between the pump and the third valve, and disposing the fourth valve in a position to permit a portion of the pressurized fluid from the pump to be delivered to the cap end of the slave actuator during extension (boom raise) of the slave actuator.

14. The method of claim 11 including a step of disposing at least one pressure sensor to provide an indication of fluid pressure within at least one of a fluid connection between the first valve and the cap end of the slave actuator, within a fluid connection between the at least one hydraulic energy storage device and the third valve, or within a fluid connection between the pump and the fourth valve.

15. The method of claim 14 further including the following steps:

providing a first pressure sensor between the first valve and the cap end of the slave actuator to provide an indication of fluid pressure, providing a second pressure sensor between the at least one hydraulic energy storage device and the third valve to provide an indication of fluid pressure, and providing a third pressure sensor between the pump and the fourth valve to provide an indication of fluid pressure.

16. The method of claim 15 further comprising steps of:

positioning the fourth valve to prevent the passage of fluid when the fluid pressure at the second pressure sensor is above a threshold setting, and positioning the fourth valve to permit the passage of fluid when the fluid pressure at the second sensor is below the threshold setting.

17. A hydraulic unit adapted for connection to a hydraulic system including a master actuator and a slave actuator coupled to and capable of moving a load, the master actuator having a rod end and a cap end, the slave actuator having a rod end and a cap end, a fluid source, a single pump adapted to deliver pressurized hydraulic fluid to each of the actuators, the master actuator being capable of providing movement based on flow between the pump and the master actuator, and between the master actuator and the fluid source, and at least one hydraulic energy storage device, the hydraulic unit being adapted to be fluidly coupled between the cap ends of the master and slave actuators, the hydraulic energy storage device, and the pump, the hydraulic unit comprising:

a first valve adapted to be fluidly coupled between the cap ends of the master and slave actuators, the first valve being configured to selectively permit passage of fluid between the cap ends, a second valve adapted to be fluidly coupled between the cap end of the slave actuator and the hydraulic energy storage device, the second valve being configured to selectively permit passage of fluid therebetween, and a third valve adapted to be fluidly coupled between the cap end of the slave actuator and each of the single pump and the hydraulic energy storage device, the third valve being configured to selectively permit passage of fluid between the single pump and the cap end of the slave actuator, and to selectively permit passage of fluid between the storage device and the cap end of the slave actuator, wherein during retraction of each of the actuators, (i) pressurized fluid is deliverable to the rod ends of the master actuator, and (ii) the first, second, and third valves are movable to respective positions to permit pressurized fluid in the cap end of the slave actuator to be delivered to the storage device for storage, wherein during extension (boom raise) of each of the actuators, the first, second, and third valves are movable to respective positions to permit (i) pressurized fluid from the pump to be delivered to the cap end of the master actuator, and (ii) pressurized stored fluid from the storage device to be delivered to the cap end of the slave actuator.

18. The hydraulic unit of claim 17 further including a fourth valve fluidly coupled between the pump and the third valve, and wherein during extension of the slave actuator, the fourth valve is movable to a position to permit a portion of the pressurized fluid from the pump to be delivered to the cap end of the slave actuator.

19. The hydraulic unit of claim 18 further including at least one pressure sensor disposed and adapted to provide an indication of fluid pressure within at least one of a fluid connection between the first valve and the cap end of the slave actuator, within a fluid connection between the at least one hydraulic energy storage device and the third valve, or within a fluid connection between the pump and the fourth valve.

20. The hydraulic unit of claim 19 including at least said second pressure sensor within the fluid connection between the at least one hydraulic energy storage device and the third valve, wherein the fourth valve is disposed and adapted to prevent the passage of fluid when the fluid pressure at the second pressure sensor is above a threshold setting, and the fourth valve is disposed and adapted to permit the passage of fluid when the fluid pressure at the second sensor is below the threshold setting.

* * * * *